NUCLEAR RADIATION DIGITAL DOSE MEASURING SYSTEM
Filed June 27, 1966
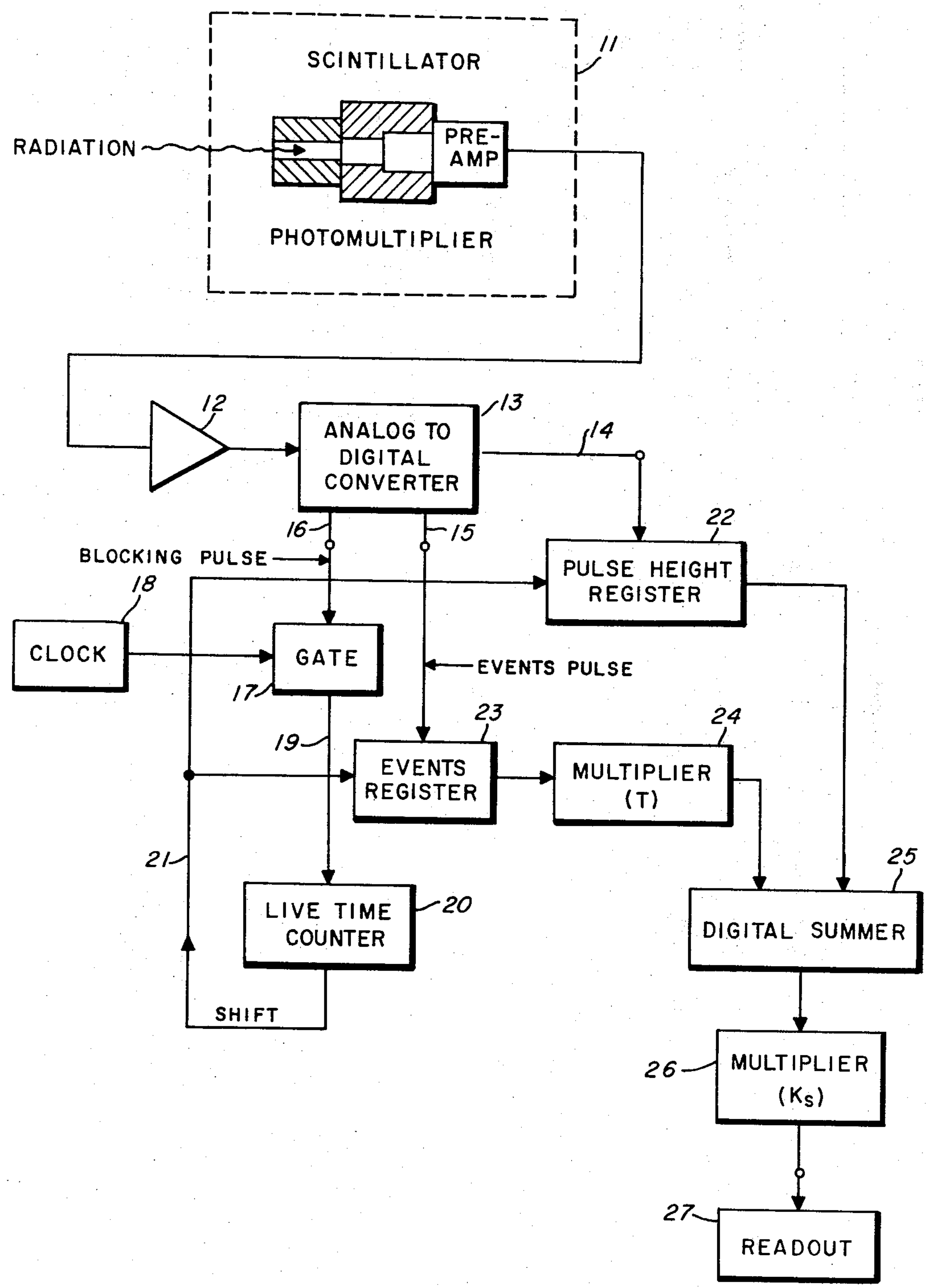
INVENTOR.
RAYMOND A. TAYLOR
BY J. Peter Mohn
AGENT
ATTORNEYS United States Patent Office 3,541,311
Patented Nov. 17, 1970

3,541,311
NUCLEAR RADIATION DIGITAL DOSE MEASURING SYSTEM

Raymond A. Taylor, San Mateo, Calif., assignor to the United States of America as represented by the Secretary of the Navy Filed June 27, 1966, Ser. No. 561,659
Int. Cl. G06m *3/02*; G01t *1/02*
U.S. Cl. 235—92 8 Claims

ABSTRACT OF THE DISCLOSURE

A digital measuring system has been provided for determining the amount of energy provided by a nuclear radiation field at a point per unit time. Two registers are used to store information provided by a radiation detector and an analog to digital converter. A timing system, consisting of a predetermined counter and a source of clock pulses, controls the readout of the storage registers.

The invention described herein may be manufactured and used by or for the Government of the United States of America for governmental purposes without the payment of any royalties thereon or therefor.

This invention relates to a system for determining nuclear radiation dose rates and more particularly to a digital system for determining the dose rate, over a predetermined period of time, of nuclear radiation.

A measurement of radiation dose rate is very often needed by those working in nuclear technology. Dose rate is a measure of the ability of a nuclear radiation field to deposit energy at a point per unit time. It may be measured in units of ergs/gram/sec. or e.v./gram/sec. of ion pairs produced in air. The deposited energy is proportional to the number of particles per unit area, the energy of each particle and to an energy dependent energy-absorption probability. A rate measurement is therefore essentially an average. The prior art proposes many methods and systems for measuring nuclear dose rates. The most commonly used utilizes an ion chamber and a vibrating reed electrometer. When nuclear events, such as gamma rays, interact with the gas in such an ion chamber, ionization of the gas occurs at a magnitude proportional to the energy of the nuclear event. The vibrating reed electrometer, which is a current averaging device, can then be used to monitor the ionization taking place in the ion chamber and consequently produce a measurement of dose rate.

However, since the ion chamber and electrometer technique is relatively insensitive, it is not suitable for some measurements. Other detectors, such as those of the scintillating type, are able to detect nuclear radiation with much greater sensitivity than an ion chamber. This invention contemplates combining such a scintillating detector with a particular arrangement of digital analyzing equipment.

The primary object of this invention therefore is to provide a sensitive dose rate measuring system.

Another object of the present invention is to provide a nuclear radiation dose measuring system which uses a scintillating type detector.

A further object of the present invention is to provide a digital nuclear dose rate measuring system.

In accordance with this invention an electrical pulse from a radiation detector is supplied to an analog-to-digital converter. The converter produces a pulse train, the number of pulses in the pulse train being dependent on the magnitude of the pulse from the detector. In response to receipt of a pulse from the detector the converter also produces a single pulse known as an events pulse. The pulse trains and the events pulses are accumulated in respective digital registers until some predetermined period of live time has elapsed. When the time period does in fact elapse the totals of accumulated pulses in each of the registers are shifted out and combined in such a manner that a resultant signal is produced which is indicative of the nuclear dose rate over the time period concerned. The signal indicative of dose rate is then supplied to a suitable readout means.

The above objects and features of this invention will be better understood from the following detailed description and appended claims in conjunction with the attached drawing wherein the single figure is a block diagram of one embodiment of the present invention.

Referring now to the figure it can be noted that the source of signals for the system to analyze is a radiation detector 11. Detector 11, in the preferred embodiment, is a scintillating type device. Contained within the structure is a scintillator, a photo multiplier and a preamplifier. When a single nuclear radiation event interacts with the scintillator, a light output is produced and the magnitude of the light output is dependent on the energy of the nuclear event. The photo multipler functions to convert the light signal from the scintillator to an electrical signal in the form of a single pulse. The magnitude of the pulse is proportional to the magnitude of the light output of the scintillator and thus the energy of the nuclear event. The preamplifier is used primarily as an impedance matching device for driving the remaining components of the system. It should be noted that other types of radiation detectors could be used and the description of the scintillating type is merely exemplary.

The output of the detector 11 is supplied to a linear amplifier 12 which is used to drive the analog-to-digital converter 13. The primary function of converter 13 is to convert its analog pulse input to an output consisting of a number of serial digital pulses. The number of serial digital pulses produced by converter 13 is proportional to the magnitude of the analog input. Consequently each time converter 13 receives an input pulse from amplifier 12 a number of serial pulses are produced on output line 14, the number being proportional to the magnitude of the input pulse.

Converter 13 also is adapted to produce a single pulse each time it receives an input. This single pulse is best identified as an event pulse since it signifies that an event has occurred, i.e., a new pulse has arrived for conversion. Such event pulses are produced on output 15 of converter 13.

In any analog-to-digital converter, a finite time is required for the device to make its conversion. In the particular type of converter used in the instant invention, i.e., single pulse to pulse train, the finite time required for conversion is variable. A longer time is required to convert large input pulses since a longer pulse train must be produced to indicate such large input pulses. During the finite conversion time the converter is not able to receive new signals to be converted and consequently it may be considered to be out of the system for the time required for conversion. This out-of-the-system time is normally referred to as dead time. It consequently follows that the time during which the converter is in the system, or available to receive new signals, is referred to as "live" time.

The third output of converter 13, line 16, is used to supply the system with a signal indicative of the dead time of the converter so that the live time of the system may be determined. The signal at output 16 has been designated as a blocking pulse. The pulse begins whenever converter 13 receives an input and ends when converter 13 has finished producing an output indicative of said input. The blocking pulse output is supplied to the control input of a gate means 17. The particular circuitry of converter 13 has not been shown since various commercial converters are available which can perform the necessary functions. One such converter is the Penco Model PA4.

Clock 18 is a continuously running pulse generator. The output of clock 18 is supplied to the gate 17. When a blocking pulse is not present at the control input of gate 17 pulses from the clock 18 are passed through the gate to line 19. When a blocking pulse is present at the control input of gate 17 output pulses from the clock are prevented from being passed through the gate to line 19. Consequently a measure of pulses produced on line 19 provides an indication of the elapsed live time of the system. Line 19 is connected to the pulse counter, or live time counter, which provides such a measure. The counter 20 accumulates all the pulses presented to its input until some predetermined number of pulses is reached. When such a number is reached counter 20 supplies a shift signal to output line 21. The function of the shift signal will be explained later in conjunction with a description of the remainder of the system.

Pulse height register 22 receives and accumulates the pulse train outputs from output 14 of the converter 13. The register 22 stores the accumulated pulses until it is provided with a shift command from counter 20. At such time the register 22 produces an output which is indicative of the accumulated number of pulses it has received from the converter 13.

Register 23 receives and accumulates events pulses from converter 13. It is also responsive to shift signals from counter 20 to produce an output indicative of the total number of such events pulses it has received over a certain period. Both registers 22 and 23 are conventional digital components and consequently will not be described in detail at this time. The remaining components are also conventional digital devices and will also not be described in detail.

The output of register 23 is supplied to a multiplier 24 which functions to multiply the register output by some predetermined constant. Consequently the output of the multiplier is an increased version of its input. The multiplier 24 output is supplied to a first input of a digital summer 25. Digital summer 25 also has a second input which is connected to receive output signals from register 22. Then summer 25 fuctions to produce a digital signal representative of the sum of those signals present at its first and second inputs. The resultant sum signal from the summer 25 is supplied to a second multiplier 26 where it is multiplied by some fixed constant K. Finally the multiplied signal is supplied to a suitable digital readout device 27.

OPERATION

For understanding the operation of the present invention it is most helpful to first consider the mathematical equation which describes the system. That equation can be expressed as:

$$\text{Dose Rate}=K_s\left(\frac{Q_t}{t}+T\frac{P_t}{t}\right)[\text{k.e.v. g.}^{-1}\text{ s.}^{-1}]$$

where $K_s$ is an empirically determined dose conversion factor and T is a threshold correction parameter. The threshold correction parameter is necessary to account for the inherent threshold in the system which prevents some of the energy deposited in the scintillator from being converted into digital pulses. The dose conversion factor $K_s$ is empirically determined by comparing dose rate indicated by the system for a known value of dose rate. $Q_t$ represents the sum of the digital pulses $q$ from all the converted voltage pulses in a time period $t$. $P_t$ represents the total number of events pulses stored in the time period $t$. The term $t$ is the predetermined live time period over which a dose rate measurement is to be made.

In the instant invention therefore $Q_t$ represents the signals stored in register 22, $P_t$ represents signals stored in register 23 and $t$ the signals stored in the live time counter 20.

In a typical period of operation the system would function as follows. When the first nuclear particle or photon impinges on the scintillator the scintillator will luminesce and produce an amount of light proportional to the energy of the nuclear event. The light from the scintillator will be converted into an electrical pulse by the photomultiplier. After the electrical pulse has been amplified by the detector preamplifier and linear amplifier 12 it will be supplied to the analog-to-digital converter 13. Converter 13 will thereupon produce a number of digital pulses at its output which is proportional to the magnitude of the electrical pulse input. Those digital pulses will enter the register 22 and be stored therein. Simultaneously with the entrance of the electrical pulse to the converter 13 an events pulse will also be produced by the converter 13 which will be passed to register 23 and stored therein. While the conversion is taking place in the converter 13 the blocking pulse will also be produced and operate to open gate 17 and consequently prevent clock pulses from the clock 18 from being passed on to the live time counter 20. When the conversion is complete the blocking pulse will cease and clock pulses from the clock 18 will pass through the gate 17 and continue to advance the live time counter 20. When the next nuclear event interacts with the scintillator the above operation will repeat itself with the result that register 22 will contain an accumulated total of the first and second conversion, events register 23 will contain an accumulated count of 2 and live time counter 20 will have a count indicative of the live time during which the system was operative to receive the impinging nuclear events. The operation will continue until counter 20 reaches a total count equal to the predetermined time period for which the dose rate determination is to be made. At that time counter 20 will produce its output shift signal which will cause registers 22 and 23 to release their accumulated totals into the remainder of the system.

The accumulated signal from register 23 will be multiplied by T in multiplier 24 and supplied as one input to the summer 25. The accumulated signal from the register 22 will be supplied to the summer 25 as its other input and consequently the summer will produce a signal indicative of the sum of its two inputs. That sum will be multiplied by $K_s$ in multiplier 26 with the resultant production of a digital signal which is directly indicative of the dose rate of inpinging nuclear events over the time period $t$ in which the system was operational. That digital dose rate signal can then be translated into a graphic indication by the readout device 27.

The maximum count for counter 20 and the pulse repetition frequency for the clock 18 are determined by the expected rate at which nuclear events will impinge on the detector. The time period over which a measurement is made should be long enough so that a sufficient number of events will be detected to yield a statistically accurate dose rate indication. For example if the expected rate of nuclear events at the detector is quite high, the maximum count of counter 20 may be relatively short and the pulse repetition frequency of the clock 18 could therefore be relatively high so that the maximum count is reached in a short period of time. If, however, the rates of nuclear events at the detector is expected to be very low the time period for observation should be long so that a sufficient number of events will be detected. With such a long observation period the clock 18 should have a relatively low pulse repetition frequency so that counter 20 will require a relatively long period of time to reach its maximum count. All of the above considerations are dictated by general statistical theory in the measurement of random events. A rough approximation of the accuracy of a counting of random events can be expressed as $$\text{Percent Accuracy} = \pm \frac{\sqrt{\#\text{ of counts}}}{\#\text{ of counts}} \times 100$$

Applying the above relation to the system of the invention it can be concluded that for an accurate determination of dose rate a sufficient number of nuclear events must be observed. If, for example, the total live time observation period of the system permitted only nine events to be recorded the statistical accuracy of the resultant dose rate measurement would be plus or minus 33⅓%, a relatively poor accuracy for a laboratory measurement. It is thus obvious that clock speed, maximum count, etc. must be determined by the environment in which the system is to be operated.

From the above it can be seen that this invention provides a simple digital method of measuring nuclear dose rates. It is suitable for various nuclear event measurements, e.g. gamma, beta, alpha, neutrons, depending on what type of detector is used.

What is claimed is:

1. In a system for determining the dose rate over a predetermined period of time of nuclear radiation, the combination comprising;

a radiation detector for receiving nuclear radiation events and adapted to produce electrical pulses having respective magnitudes proportional to the energy of each of said nuclear events in response to receipt of said events, an analog-to-digital converter connected to receive electrical pulses produced by said detector and adapted to produce a number of serial digital pulses proportional to the magnitude of each of said electrical pulses, said analog-to-digital converter also being adapted to produce a single events pulse in response to each pulse from said detector, timing means for producing a digital pulse signal indicative of the live time elapsing from the beginning of said predetermined time period during which measurements are conducted, a first digital register for receiving and accumulating said serial digital pulses from said analog-to-digital converter, a second digital register for receiving and accumulating said events pulses from said analog-to-digital converter, each of said first and second registers being adapted to produce output signals representative of their respective accumulated pulses in response to receipt of a shift signal, a counter for receiving and accumulating said signal from said timing means and adapted to produce an output shift signal when the number of accumulated signals from said timing means reaches some preset total indicative of said predetermined period of time, multiplier means having an input and an output and adapted to produce a signal at said output which represents a signal at said input multiplied by a fixed predetermined constant, summing means having first and second inputs and an output and adapted to produce a signal at its output proportional to the sum of any signals at its said inputs, said summing means first input being connected to said multiplier output, said multiplier means input being connected to receive accumulated events pulses from said second digital register, said summing means second input being connected to receive said accumulated pulses from said first digital register, said counter output shift signal being connected to said first and second digital registers whereby upon reaching said preset total of timing means signals said registers are caused to shift their respective accumulated signals to said summing means and multiplier respectively, said summing means output being provided with a readout device whereby a signal representing the dose rate of radiation at said detector over said predetermined period of time is produced on said readout at the end of each said time period.

2. The combination of claim 1 wherein said converter is adapted to produce a blocking signal having a time duration equal to the finite time required for said converter to produce its said serial pulses from said electrical pulses from said detector and wherein;

said timing means comprises;

a source of regular recurring digital pulse clock signals, gating means having first and second inputs and an output and adapted to pass signals from the first input to its output when no signals are present at its second input, said second input being connected to receive blocking signals from said converter, said source of clock signals being connected to said gating means first input, said gating means output being indicative of live time.

3. The combination of claim 1 and further including;

linear amplifier means adapted to receive said detector electrical pulse and supply an amplified version of said pulse to said converter.

4. The combination of claim 1 wherein;

said nuclear radiation events are gamma rays.

5. The combination of claim 1 wherein;

said nuclear radiation events are alpha rays.

6. The combination of claim 1 wherein;

said nuclear radiation events are beta rays.

7. The combination of claim 1 wherein;

said nuclear radiation events are neutrons.

8. The combination of claim 1 wherein said detector is of the scintillation type.

References Cited

UNITED STATES PATENTS

| | | | |
|---|---|---|---|
| 3,160,740 | 12/1964 | Mann et al. | 235—92 |
| 3,408,644 | 10/1968 | Kintner | 340—347 |

MAYNARD R. WILBUR, Primary Examiner

J. M. THESZ, Jr., Assistant Examiner

U.S. Cl. X.R.

250—83.3